C. T. HENDERSON.
CONTROLLER FOR ELECTRIC MOTORS.
APPLICATION FILED JULY 10, 1909.
1,062,096.
Patented May 20, 1913.
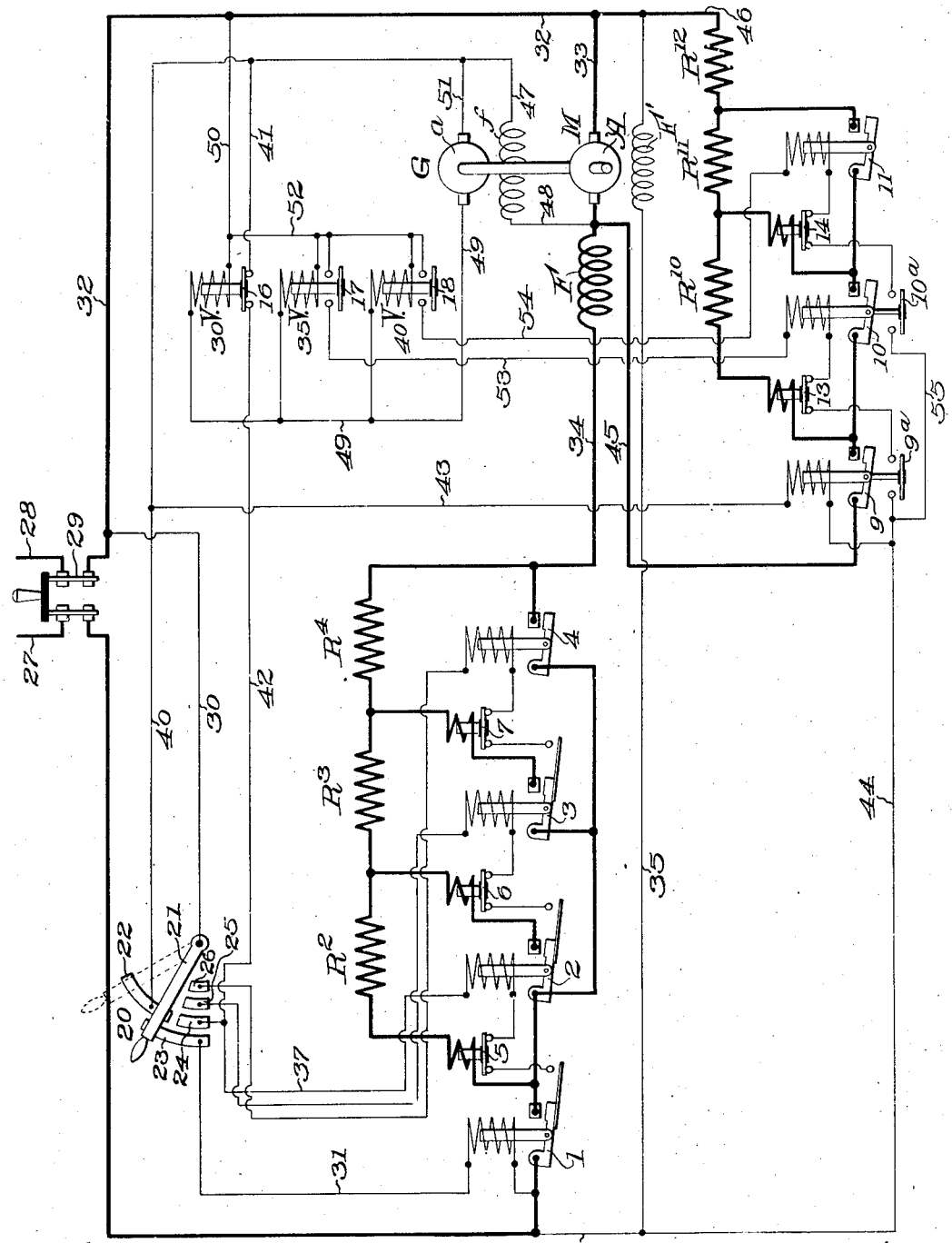
Witnesses:
George Haynes
W. Fitzgerald
Inventor:
Clark T. Henderson.
By Edwin B. H. Tower Jr.
Atty.

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

1,062,096.　　　　Specification of Letters Patent.　　Patented May 20, 1913.

Application filed July 10, 1909.　Serial No. 506,960.

*To all whom it may concern:*

Be it known that I, CLARK T. HENDERSON, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

My invention relates to improvements in controllers for electric motors and more particularly to means for controlling the speed thereof.

In many instances where motors operate under varying loads, it is desirable to reduce the speed thereof to a predetermined value, regardless of their load. This is particularly desirable where the load is to be brought to rest at a given point, or points, in its travel. The use of series resistance alone is impractical for accomplishing this result and resort has, therefore, been made to the use of both series resistance and armature shunt resistance. With the latter arrangement, where a fixed resistance is connected in shunt with the motor armature, the variation in the motor speed under a given variation in load may be decreased somewhat, but the variation in speed of the motor is, nevertheless, very noticeable, and, in many cases, objectionable.

My invention, therefore, has for its object to provide means for automatically adjusting either or both of the resistances to meet varying conditions.

A further object of my invention is to provide means for reducing the variation in the motor speed under a given variation in load to a maximum.

Various other objects and advantages of my invention will be hereinafter clearly and fully set forth.

In order to more clearly disclose the characteristic features of my invention, I shall describe the controller diagrammatically illustrated in the accompanying drawing, which embodies my invention in one form. The drawing is merely intended to illustrate the general principles of my invention, and, for the purpose of simplifying the illustration thereof, I have omitted many of the elements which would be used in practice. Of course, my invention is susceptible of various modifications.

The controller illustrated includes a plurality of elements which, for convenience of description, I shall divide into three groups. One group includes a main switch 1, accelerating switches 2, 3 and 4, and throttling switches 5, 6 and 7, one for each of the accelerating switches. The main switch 1 is arranged to control the circuit of the motor M, which, as illustrated, is provided with an armature A, a series field winding F and a shunt field winding F'. Of course, my invention is applicable to other types of motors. The switches 2, 3 and 4 are arranged to control resistances $R^2$, $R^3$ and $R^4$, arranged in series with the motor armature, as will be hereinafter set forth.

The second group of elements includes a controlling switch 9 and resistance switches 10 and 11. As will be hereinafter set forth, the switch 9 is adapted to close a shunt circuit across the terminals of the motor armature including resistances $R^{10}$, $R^{11}$ and $R^{12}$, while the switches 10 and 11, when operated, are adapted to short-circuit the resistances $R^{10}$ and $R^{11}$ respectively. The switches 10 and 11 are preferably provided with relay devices 13 and 14 respectively, for the purpose hereinafter set forth.

The third group of elements includes a generator G and relay switches 16, 17 and 18. The generator G is provided with an armature $a$, connected to and adapted to operate with the armature A of the motor M. The generator G is also provided with a shunt field winding $f$, which, as will be hereinafter set forth, is adapted to be connected across the terminals of the motor armature A.

Each of the switches heretofore mentioned is provided with a suitable operating winding. For initially controlling the operation of the various switches, I have illustrated a master controller 20. It should be understood that my invention is not limited to any particular form of master controller and that, if preferred, various independent devices could be employed for controlling the operation of the switches. As illustrated, the master controller comprises a movable arm 21 adapted, when in the position illustrated in dotted lines, to engage a contact 22. When moved from this position, the arm 21 is adapted to engage contact segments 23, 24, 25 and 26. The segments 22 and 23 are shown as overlapping, so that in an intermediate position of arm 21 the same will merely engage said two segments.

I shall now describe the starting operation of the motor. In starting, the motor is controlled entirely by the first group of elements described. In my prior Patent No. 890,979, granted June 16, 1908, I have fully disclosed the combination of elements comprising the first group herein mentioned and the operation thereof. I shall, therefore, only briefly describe the operation of this set of elements in the present case.

Assuming that current is supplied to the operating windings of the various switches of this group from main lines 27 and 28, through a double pole switch 29, upon movement of the arm 21 of the master switch into engagement with all of the contacts 23 to 26 inclusive, the following circuits will be established. Circuit will first be closed from main line 28 by conductor 30, through the master switch, by conductor 31, through the operating winding of switch 1, and thence to main line 27. The switch 1 is thereupon closed, thereby closing the motor circuit which may be traced from main line 28 by conductors 32 and 33, through the motor armature A and series field winding F, by conductor 34, through the resistances $R^4$, $R^3$ and $R^2$, thence through the operating winding of relay switch 5 and main switch 1 to the negative side of the main line. The shunt field winding F' of the motor has one terminal thereof connected to conductor 32 and its opposite terminal connected by conductors 35 and 36 to the opposite side of the main line. The motor is thus started with all of the starting resistance in circuit. If there is an excessive surge of current through the motor, upon closure of switch 1, the relay device 5 will respond to prevent removal of any of the resistance from the motor circuit. On the other hand, if the flow of current through the motor is not excessive, or, after normal conditions are restored, in event that the relay device does respond, circuit will be closed from contact 24 of the master switch by conductor 37, through the operating winding of switch 2, thence through the relay switch 5 and main switch 1 to the opposite side of the main line. The switch 2 is thereupon closed, removing the resistance $R^2$ from the motor circuit. Closure of the switch 2 completes the circuit of the switch 3 and connects the relay device 6 in circuit. If the relay device 6 responds to an excessive flow of current through the motor, the switch 3 will not respond until normal conditions are restored. Otherwise switch 3 will operate immediately upon closure of the switch 2, and, when operated, will short-circuit the resistance $R^3$ from the motor circuit. The operation of the switch 4 is controlled by the switch 3 and the relay device 7 in the same manner as that described in connection with switch 3. When all of the switches 2, 3 and 4 have been operated, the same will short-circuit all of the resistance included in the motor circuit, and, consequently, the motor will be brought up to normal speed.

Assuming now, that it is desired to reduce the speed of the motor to a predetermined value, the arm 21 of the master switch should be moved into the position illustrated in full lines. In this position the switch arm 21 disengages the contacts 25 and 26, and, consequently, interrupts the circuits of the operating windings of the resistance switches 3 and 4, which thereupon open, reinserting the resistances $R^3$ and $R^4$ in the motor circuit. In this position the arm 21 also disengages the contact 24, and, consequently, would interrupt the circuit of the resistance switch 2, but for the fact that a maintaining circuit is established therefor. This maintaining circuit may be traced from main line 28, by conductor 30, through the switch arm 21 to contact segment 22, by conductors 40 and 41, through the switch 16, by conductor 42, to conductor 37, and thence through the winding of the switch 2 as already traced. The switch 2 is, therefore, maintained closed, as is also the main switch 1 whose operating winding has not been de-energized upon movement of the master controller to the position mentioned.

Besides the establishment of the circuits just mentioned, a circuit is also established from conductor 40, by conductor 43, through the operating winding of the controlling switch 9, by conductor 44 to the negative side of the main line. Thereupon the switch 9 is closed, thereby completing a circuit across the terminals of the motor armature. This circuit may be traced from one terminal of the motor armature, by conductor 45, through the switch 9, thence through the winding of the relay device 13 and through the resistances $R^{10}$, $R^{11}$ and $R^{12}$, by conductors 46 and 33 to the opposite terminal of the motor armature. The reinsertion of the resistances $R^3$ and $R^4$ in series with the motor and the establishment of the circuit across the terminals of the motor armature will cause the motor to slow down in the well known manner.

Before proceeding further, let it be assumed that when the motor is operating as a motor under a given maximum load, the establishment of the circuits just mentioned will slow down the motor to the desired speed. Hence, if the motor is operating under a load less than the given maximum, the same will tend to run at increased speed, thereby necessitating the insertion of more series resistance or the removal of a portion of the shunt resistance to reduce the speed thereof to the predetermined value. The desired speed reduction under such conditions is accomplished in the following manner by the second and third groups of elements hereinbefore set forth. Upon movement of the master controller to the position just described, the following circuits are established. The field winding of the generator G is connected across the terminals of the motor armature. This circuit may be traced from one terminal of the motor armature by conductors 32 and 30 through the master switch by conductors 40 and 47, thence through said field winding by conductor 48 to the opposite terminal of the motor armature. Circuit is also closed from one terminal of the generator armature by conductor 49 through the windings of the switches 16, 17 and 18 in parallel by conductor 50 to conductor 32, thence by conductor 30 through the master switch, and by conductors 40 and 51 to the opposite terminal of the generator armature.

In practice, the switches 16, 17 and 18 would be set to respond at different predetermined voltages. For instance, switch 16 might be set to respond at 30 volts, the switch 17 at 35 volts and the switch 18 at 40 volts.

Before proceeding further, it should be noted that inasmuch as the generator armature is connected to and operated at the same speed as the motor armature and the generator field winding is connected across the terminals of the motor armature, the electromotive force of the generator will vary with the product of the speed and the electromotive force of the motor armature. Consequently, any variation in the speed of the motor and consequent variation in the counter electromotive force generated thereby, will be magnified in the electromotive force of the generator. To illustrate, with the arrangement shown, 100% change in the speed of the motor will result in approximately 400% change in the electromotive force of the generator. That is, the electromotive force of the generator will vary approximately with the square of the speed of the motor. It will thus be seen that any variation in the speed of the motor will vary the electromotive force of the generator, and, consequently, vary the potential impressed upon the windings of the relay switches 16, 17 and 18. Hence, if the load on the motor is below a given maximum, the motor will tend to operate at an increased speed as previously set forth, thereby increasing the electromotive force of the generator. Thus, if the speed of the motor is sufficiently great, the generator will impress 30 volts upon the switch 16, thereby causing the same to respond. The responding of the switch 16 opens the maintaining circuit for the operating winding of the resistance controlling switch 2. This switch thereupon opens, thereby reinserting the resistance $R^2$ in series with the motor. The insertion of this resistance, of course, tends to further reduce the speed of the motor. However, if the insertion of this resistance fails to reduce the speed of the motor to the predetermined value, then the switch 17 would respond. Closure of the switch 17 completes a circuit from main line 28 by conductors 32 and 50 by conductor 52, through the switch 17, by conductor 53, through the operating winding of the switch 10 and through the throttling switch 13 and auxiliary switch $9^a$ of the switch 9, by conductor 44 to main line 27. Closure of this circuit energizes the operating winding of the switch 10, thereby closing said switch and short-circuiting the resistance $R^{10}$ from the shunt circuit across the terminals of the motor armature. As is well understood, the short-circuiting of the resistance $R^{10}$ tends to still further decrease the speed of the motor. Again, if the removal of the resistance $R^{10}$ fails to reduce the speed of the motor to the predetermined value, then the switch 18 will respond, completing a circuit from conductor 52, through said switch by conductor 54, through the operating winding of resistance switch 11, thence through the throttling switch 14 and auxiliary switch $10^a$ of the resistance switch 10 by conductors 55 and 44 to main line 27. Thereupon the switch 11 would respond, thereby removing the resistance $R^{11}$ from the shunt circuit across the motor armature. The removal of this resistance still further reduces the speed of the motor and with a predetermined minimum load would bring the motor to the desired speed. In practice, if the motor is intended to operate under greater variations in load, then it is only necessary to provide more resistance switches and relay devices to accomplish the desired result. Of course, it should be understood that the several relay switches might be actuated by a single coil instead of individual coils.

Referring, now, to the arrangement of switches for controlling the shunt resistances, it will be seen that the same are interlocked to close in a definite sequence. Furthermore, the circuits of the operating windings of the switches 10 and 11 each include a throttling switch. The purpose of these throttling switches is to check the operation of their respective resistance switches upon an excessive flow of current through the shunt circuit. The throttling switches 13 and 14 are essential for the reason that in slowing down, the motor acts as a generator and sends current through the shunt circuit across its armature terminals. Consequently, if the shunt resistances were removed from circuit while the motor operated as a generator at a high speed, then dangerous conditions would set up therein.

To stop the motor at any time, it is only necessary to throw the master switch to the position illustrated in dotted lines. This deenergizes the main switch 1, which thereupon disconnects the motor from circuit. Also when in this position, the master switch causes the energization of the switch 9 in the manner previously set forth. This establishes a dynamic braking circuit across the terminals of the motor armature, including the resistances $R^{10}$, $R^{11}$ and $R^{12}$.

I claim—

1. In a controller for electric motors operating under variable loads, in combination, means responsive at different predetermined voltages for reducing the speed of the motor, and means for causing variations in the voltage impressed upon said first mentioned means proportional to but wider in range than the variations in the speed of the motor.

2. In a controller for electric motors operating under variable loads, in combination, means responsive at different predetermined voltages for reducing the speed of the motor, and means for causing variations in the voltage impressed upon said first mentioned means proportional to but wider in range than the variations in the electromotive force of the motor.

3. In a controller for electric motors operating under variable loads, in combination, means responsive at different predetermined voltages for reducing the speed of the motor, and a generator driven by the motor for causing variations in the voltage impressed upon said means proportional to but wider in range than the variations in the speed of the motor.

4. In a controller for electric motors operating under variable loads, in combination, means responsive at different predetermined voltages for reducing the speed of the motor, and a generator driven by the motor for causing variations in the voltage impressed upon said means proportional to but wider in range than the variations in the speed and electromotive force of the motor.

5. In a controller for electric motors operating under variable loads, in combination, a resistance connected in series with the motor armature, a resistance connected in shunt with the motor armature, electroresponsive devices arranged to respond at different predetermined voltages for varying said resistances to slow down the motor, and means for causing variations in the voltage impressed upon said devices proportional to but wider in range than the variations in the speed of the motor.

6. In a controller for electric motors operating under variable loads, in combination, a resistance connected in series with the motor armature, a resistance connected in shunt with the motor armature, electroresponsive devices arranged to respond at different predetermined voltages for varying said resistances to slow down the motor, and means for causing variations in the voltage impressed upon said devices proportional to but wider in range than the variations in the electromotive force of the motor.

7. In a controller for electric motors operating under variable loads, in combination, a resistance connected in series with the motor armature, a resistance connected in shunt with the motor armature, a plurality of electroresponsive devices arranged to respond at different predetermined voltages to vary said resistances to slow down the motor, and a generator for supplying current to said devices, said generator being arranged to vary the voltage impressed upon said devices upon variations in the speed of the motor.

8. In a controller for electric motors operating under variable loads, in combination, automatic devices for slowing down the motor, and means for causing said devices to operate successively upon predetermined variations in the speed and electromotive force of the motor armature to slow down the motor to substantially a predetermined value, regardless of the load under which the motor operates.

9. In a controller for electric motors operating under variable loads, in combination, electroresponsive devices for slowing down the motor, and a generator driven by the motor and having its field winding connected across the terminals of the motor armature, for supplying current to said devices and for varying the potential impressed thereon upon variations in the speed of the motor, said devices being adapted to respond at different predetermined voltages to slow down the motor to substantially a predetermined value, regardless of the load under which the motor operates.

10. In a controller for electric motors operating under variable loads, in combination, a variable resistance, automatic devices for regulating said resistance to slow down the motor, and means for causing said devices to operate successively upon predetermined variations in the speed and electromotive force of the motor armature to reduce the speed of the motor to substantially a predetermined value, regardless of the load under which the motor operates.

11. In a controller for electric motors operating under variable loads, in combination, a variable resistance, electroresponsive devices for regulating said resistance to slow down the motor, said devices being adapted to respond at different predetermined voltages, and a generator driven by the motor and having its field winding connected across the terminals of the motor armature, said generator being adapted to supply current to said devices and to vary the potential impressed thereon upon variations in the speed of the motor to cause said devices to reduce the speed of the motor to substantially a predetermined value, regardless of the load under which the motor operates.

12. In a controller for electric motors operating under variable loads, in combination, a variable resistance, means for connecting the said resistance in shunt to the motor armature to slow down the motor, electroresponsive devices adapted to operate at different predetermined voltages to regulate said resistance to further slow down the motor, and a generator driven by the motor and having its field winding connected across the terminals of the motor armature, said generator being adapted to supply current to said devices and to vary the potential impressed thereon upon variations in the speed of the motor to cause said devices to reduce the speed of the motor to substantially a predetermined value, regardless of the load under which the motor operates.

13. In a controller for electric motors operating under variable loads, in combination, a series resistance, an armature shunt resistance, automatic devices for regulating said resistances to reduce the speed of the motor, and means for causing said devices to operate successively upon predetermined variations in the speed and electromotive force of the motor armature to reduce the speed of the motor to substantially a predetermined value, regardless of the load under which the motor operates.

14. In a controller for electric motors operating under variable loads, in combination, a series resistance, an armature shunt resistance, electroresponsive devices for regulating said resistances to slow down the motor, and a generator driven by the motor for supplying current to said devices and for varying the potential impressed thereon upon variations in the speed of the motor, said devices being adapted to respond at different predetermined voltages to reduce the speed of the motor to substantially a predetermined value, regardless of the load under which the motor operates.

15. In a controller for electric motors, in combination, means for closing the motor circuit, means for connecting a variable resistance across the terminals of the motor armature to slow down the motor, automatic devices for gradually removing said resistance from circuit to further slow down the motor, and means for checking the operation of said devices until the electromotive force of the motor decreases to different predetermined values.

16. In a controller for electric motors, in combination, means for connecting the motor in circuit, means for connecting a variable resistance in shunt with the motor armature for slowing down the motor, means tending to remove portions of said resistance from circuit upon predetermined variations in the motor speed, and means for checking the removal of said portions of resistance upon an excessive flow of current through the shunt circuit.

17. In a controller for electric motors, in combination, means for connecting the motor in circuit, means for connecting a variable resistance in shunt with the motor armature for slowing down the motor, electroresponsive switches for removing portions of said resistance from circuit upon predetermined variations in the speed of the motor and electroresponsive means for checking the operation of said switches upon an excessive flow of current through the shunt circuit.

18. In a controller for electric motors, in combination, means for connecting the motor in circuit, means for connecting a variable resistance in shunt with the motor armature for slowing down the motor, electroresponsive switches for removing portions of said resistance from circuit upon predetermined variations in the speed of the motor, and an electroresponsive throttling switch for each of said resistance switches, each of said throttling switches being adapted to check the operation of its corresponding resistance switch while abnormal conditions exist in the shunt circuit.

19. In a controller for electric motors operating under varying loads, in combination, a generator driven by the motor and having its field winding connected across the terminals of the motor, and electroresponsive means for varying the circuit connections of the motor in accordance with the potential of said generator to reduce the speed of the motor to a predetermined value, regardless of the load under which the motor operates.

20. In a controller for electric motors operating under varying loads, in combination, a generator driven by the motor, said generator having a field winding adapted to be connected across the terminals of the motor armature, electroresponsive switches adapted to be connected in the generator circuit and to respond at different predetermined voltages to slow down the motor in accordance with the voltage of said generator, and means for connecting said switches in the generator circuit and completing the field circuit of said generator to automatically reduce the speed of the motor to a predetermined value, regardless of the load under which the motor operates.

21. In a controller for electric motors operating under variable loads, in combination, a plurality of resistance sections, a plurality of electroresponsive switches for regulating said resistances to slow down the motor, a plurality of relay switches adapted to operate at different predetermined voltages to control the circuits of said resistance switches, and means for varying the voltage impressed upon said relay switches upon variations in the speed of the motor.

22. In a controller for electric motors operating under variable loads, in combination, a plurality of resistance sections, a plurality of electroresponsive switches for regulating said resistances to slow down the motor, a plurality of relay switches adapted to operate at different predetermined voltages to control the circuits of said resistance switches, and a generator for supplying current to said relay switches, said generator being driven by the motor and having its field winding connected across the terminals of the motor armature whereby said generator will vary the voltage impressed upon said relay switches upon variations in the speed or electromotive force of the motor.

23. In a controller for electric motors operating under variable loads, in combination, a series resistance, a shunt resistance, a plurality of electroresponsive switches for varying said resistances, a plurality of relay switches responsive at different predetermined voltages to control the operation of said resistance switches to slow down the motor, a generator for supplying current to said relay switches, said generator being driven by the motor and adapted to have its field winding connected across the terminals of the motor armature, thereby varying the voltage impressed upon said relay switches upon variations in the speed and electromotive force of said motor to automatically reduce the speed of the motor to a predetermined value regardless of the load under which the motor operates.

24. In a controller for electric motors, in combination, means for connecting the motor in circuit, means for connecting a variable resistance in shunt with the motor armature for slowing down the motor, means tending to remove portions of said resistance from circuit upon predetermined variations in the motor speed, means for checking the removal of said portions of resistance upon an excessive flow of current through the shunt circuit, and means for checking the operation of the shunt resistance controlling switches upon an excessive flow of current through the shunt circuit.

25. In a controller for electric motors operating under varying loads in combination, a generator driven by the motor, means causing said generator upon variations in the speed of the motor to produce an electromotive force proportional to but wider in variation than the speed of the motor, resistance for reducing the speed of the motor by transforming a portion of the energy taken from the line into heat, and electroresponsive means responsive to the varying electromotive force of said generator for varying said resistance to maintain approximately constant speed of the motor.

26. In a controller for electric motors operating under varying loads in combination, a generator driven by the motor, means causing said generator upon variations in the motor speed to produce an electromotive force proportional to but wider in variation than the motor speed, resistance for reducing the speed of the motor by transforming a portion of the energy taken from the line into heat, and a plurality of electroresponsive devices responsive to the varying electromotive force of said generator and adjusted to respond at different predetermined voltages for varying said resistance to maintain approximately constant speed of the motor.

27. In a controller for electric motors operating under varying loads in combination, resistance for reducing the speed of the motor by transforming a portion of the energy taken from the source of supply into heat, a generator driven by the motor and having a field winding connected across the terminals of the motor armature, said generator producing a varying electromotive force upon variation in the speed of the motor proportional to but wider in variation than the speed of the motor, and means responsive to the varying electromotive force of said generator for regulating said resistance to maintain approximately constant speed of the motor.

In witness whereof, I have hereunto subscribed my name in the presence of two witnesses.

CLARK T. HENDERSON

Witnesses:
 FRANK H. HUBBARD,
 S. W. FITZ GERALD.